US 6,591,377 B1

(12) United States Patent
Evoy (10) Patent No.: US 6,591,377 B1
(45) Date of Patent: Jul. 8, 2003

(54) METHOD FOR COMPARING SYSTEM STATES AT DIFFERENT POINTS IN TIME

(75) Inventor: Jerry Michael Evoy, San Dimas, CA (US)

(73) Assignee: Unisys Corporation, Blue Bell, PA (US)

(*) Notice: Subject to any disclaimer, the term of this patent is extended or adjusted under 35 U.S.C. 154(b) by 0 days.

(21) Appl. No.: 09/448,232

(22) Filed: Nov. 24, 1999

(51) Int. Cl.⁷ .............................................. G06F 11/00
(52) U.S. Cl. ...................................................... 714/37
(58) Field of Search ........................... 714/15, 21, 37, 714/20, 25, 48, 49; 717/172

(56) References Cited

U.S. PATENT DOCUMENTS

| | | | | |
|---|---|---|---|---|
| 5,045,994 A | * | 9/1991 | Belfer et al. .................. | 703/25 |
| 5,500,940 A | * | 3/1996 | Skeie .......................... | 714/25 |
| 5,644,701 A | * | 7/1997 | Takewaki .................... | 714/20 |
| 5,701,293 A | * | 12/1997 | Fujii ......................... | 370/244 |
| 5,745,669 A | * | 4/1998 | Hugard et al. ................ | 714/3 |
| 5,860,012 A | * | 1/1999 | Luu ........................... | 709/220 |
| 5,933,633 A | * | 8/1999 | Good et al. .................. | 703/17 |
| 6,016,553 A | * | 1/2000 | Schneider et al. ............ | 714/21 |
| 6,044,475 A | * | 3/2000 | Chung et al. ................. | 714/15 |
| 6,073,089 A | * | 6/2000 | Baker et al. ................. | 702/185 |
| 6,205,527 B1 | * | 3/2001 | Goshey et al. ............... | 711/162 |
| 6,209,089 B1 | * | 3/2001 | Selitrennikoff et al. ........ | 713/2 |
| 2001/0052087 A1 | * | 12/2001 | Garg et al. ................... | 714/37 |

* cited by examiner

*Primary Examiner*—Robert Beausoliel
*Assistant Examiner*—Gabriel L. Chu
(74) *Attorney, Agent, or Firm*—Phuong-Quan Hoang; Mark T. Starr; Lise A. Rode (57) ABSTRACT

In a computer system having a memory and an operating system persistently stored in a storage device, a method for comparing System States of the system from time to time. The method includes creating a snapshot object for interfacing with functionalities of the system; and using the snapshot object, creating a first collection of System State objects which record the status of the system at a given instant in time. Next, the first collection of System State objects is stored in the memory. A second collection of System State objects, which was previously created and stored in the storage device, is then loaded into the memory. A comparison of the first collection with the second collection is made and an indicia of any differences therebetween is provided.

16 Claims, 13 Drawing Sheets

METHOD FOR COMPARING SYSTEM STATES AT DIFFERENT POINTS IN TIME

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of object-oriented computer programs and in particular to a method for generating a snapshot of an operating system environment for use in comparing System States at different points in time.

BACKGROUND OF THE INVENTION

With increasing complexity of administering computer systems today, it would be desirable to detect changes in System State of such a complex computer system over a period of time. "System State" is defined as a run-time state of a system's components at a particular instant in time.

The components of a computer system that may be of interest at run-time are its hardware, file systems, processes running on the system and its registry. The term hardware of a computer system refers to objects that can be actually touched like disks, disk drives, display screens, keyboards, printers, boards, and chips. In contrast software is untouchable. Software exists as ideas, concepts, and symbols but has no substance. File system refers to a system that an operating system or a program uses to organize and keep track of files. For example, a hierarchical file system is one that uses directories to organize files into a tree structure. A process is a program being executed by a computer system and the term is used loosely as a synonym for task hereinbelow. A process performs some useful operations on data. Typically, an operating system is capable of running several processes at the same time. Hence, at any given time there could be one or more processes running on a computer system. A registry is a database used by the Windows (also Windows NT) operating system to store configuration information. The Registry consists of the following major sections:

HKEY_Classes_Root—file associations and OLE information

HKEY_Current _User—all preferences set for current user

HKEY_User—all the current user information for each user of the system

HKEY_Local_Machine—settings for hardware, operating system, and installed applications HKEY_Current_Configuration—settings for the display and printers Most Windows applications write data to the Registry, at least during installation. A registry can be edited directly by using the Registry Editor provided with the operating system. However, great care must be taken during editing the Registry because errors in the Registry could disable a computer system.

Changes to any of these components can result in a change in System State.

As the Windows NT operating system is increasingly becoming an enterprise wide operating system a larger number of system administrators need methods that can help them diagnose and solve problems in a shorter period of time. In particular, there is a need for a method that could compare and contrast System States of a single server before and after a program installation or execution. Such a program installation could potentially affect one or more of the components of a system depending on the nature of the particular program being executed or installed. The prior art technique is limited to the extent that it allows monitoring of the current state of the system components, but provides no method for readily comparing and contrasting the current state of the system with a previously recorded state.

The prior art is also limited because it does not allow a comparison of a multitude of different systems. This capability would be useful in a scenario where the user, who typically is a person responsible for maintaining redundant, mirrored or backup machines, would be trying to determine if two setups on two different machines were performed correctly or consistently.

Another limitation of the prior art techniques is that it does not provide a method for detecting if hardware, for example the disk drives, processors, memory, or printers, failed or went off-line between uses or re-boots. Such a capability would enable a system administrator to troubleshoot a problem with a hardware device failure occurring in conjunction with a system outage.

Still another limitation with the prior art is that it does not provide a method for detecting changes to a file system over time. Such a capability would be helpful in maintaining directories by checking for the creation of certain files and by comparing and contrasting the file sizes created at different points in time, which could help in dynamically limiting file size in order to conserve disk space.

The prior art is also limited by the fact that there is no method to compare and contrast the complete system registry from different points in time in order to identify those areas of the registry that have changed over time. These and other limitations of the prior art have been addressed by the method of the present invention.

SUMMARY OF THE INVENTION

It is therefore an object of this invention to provide a method for comparing and contrasting System States from different points in time in order for a user to diagnose and solve complex system administration problems in a time span shorter than that provided with the prior art techniques. Users of an embodiment of the present invention would be typically computer technology administrators, researchers, or developers who would be interested in comparing the states of the components of a computer system at different points in time. By using this invention they will be able to diagnose system problems more efficiently, both in terms of speed and accuracy. This would result in overall cost reductions in operating and maintaining a computer system as well as higher availability levels of its critical components.

An object of this invention is to provide a method for comparing and contrasting System States of multiple, or different computer systems so that system administrators who are trying to maintain redundant, mirrored, or backup machines can determine accurately if any two setups were performed correctly and consistently.

Another object of this invention is to provide a method for determining whether or not certain pieces of hardware, such as disk drives, processors, memory or printers, fail or go off line between uses or boots.

Still another object of this invention is to provide a method for comparing the file system at different points in time in order to maintain files of the right size and number.

Yet another object of this invention is to provide a method for comparing and contrasting the complete system registry at different points in time in order to identify any changes.

An advantage of this invention is that it allows the user to determine if a particular program or service is running or not running when compared to a previous point in time. This would be useful in a situation where a potentially bigger and more observable problem is the result of a program or service running on the system, and the system administrator needs to trouble-shoot the system to find out if that program or service is currently running on the system. The administrator can use the method of this invention to compare all the programs that are currently running to all the programs that were running in a previously recorded "healthy" state and determine the difference in the number and type of programs running at the two points in time.

A feature of this invention is that it provides a scriptable interface, which means it can be used to record System States at different points in time even in the physical absence of the user. By simply using scripts, the method of this invention can be used to provide an update of all the system components at fixed intervals of time.

These and other objects, which will become apparent as the invention is described in detail below, where in a computer system having a memory and an operating system persistently stored in a storage device, a method is disclosed for comparing System States of the system from time to time. The method includes creating a snapshot object for interfacing with functionalities of the system; and using the snapshot object, creating a first collection of System State objects which record the status of the system at a given instant in time. Next, the first collection of System State objects is stored in the memory. A second collection of System State objects, which was previously created and stored in the storage device, is then loaded into the memory. A comparison of the first collection with the second collection is made and an indicia of any differences therebetween is provided.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit-and byte-ordering and the transmission and error detection as well as correction of the bit stream. High-level protocols deal with message formatting, including the syntax of messages, the terminal to computer dialogue, character sets, sequencing of messages, etc. The term schema as used herein refers to the logical description of data in a database, including definitions and relationships of data.

Figure 1:
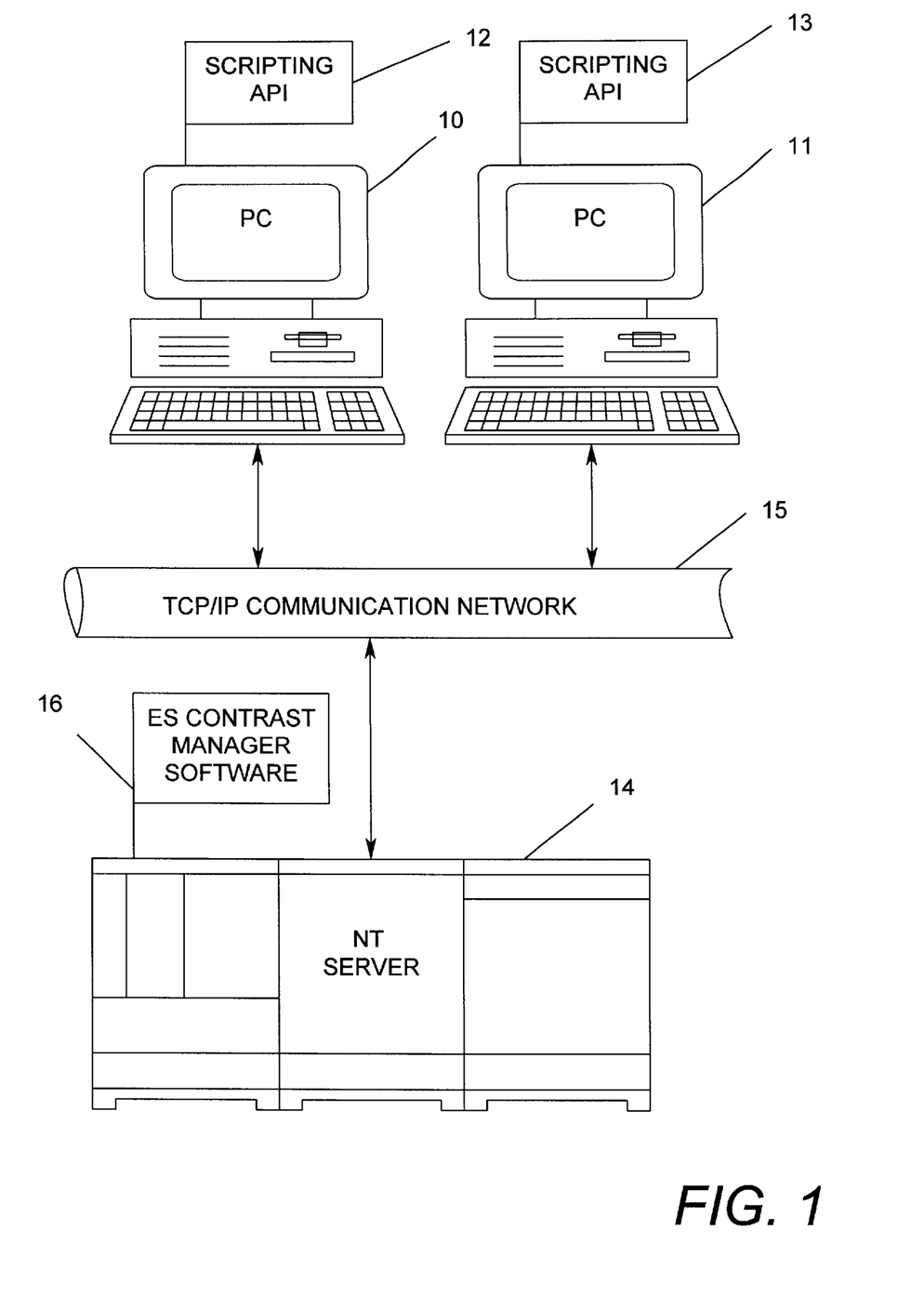
FIG. 1 is a block diagram of a computing system that may employ the system and method of the present invention.

Referring now to the drawings and FIG. 1 in particular, a computer system capable of executing the method of the present invention is shown. PC's 10 and 11 run script software 12 and 13, respectively, which is an Application Program Interface (API) to other software. The PC's 10 and 11 are coupled to an NT server 14 by means of a TCP/IP communication network 15. The API can be scripted to allow users to control and manipulate the functionality of a Contrast Manager Application software 16 being executed by the NT server 14.

Figure 2:
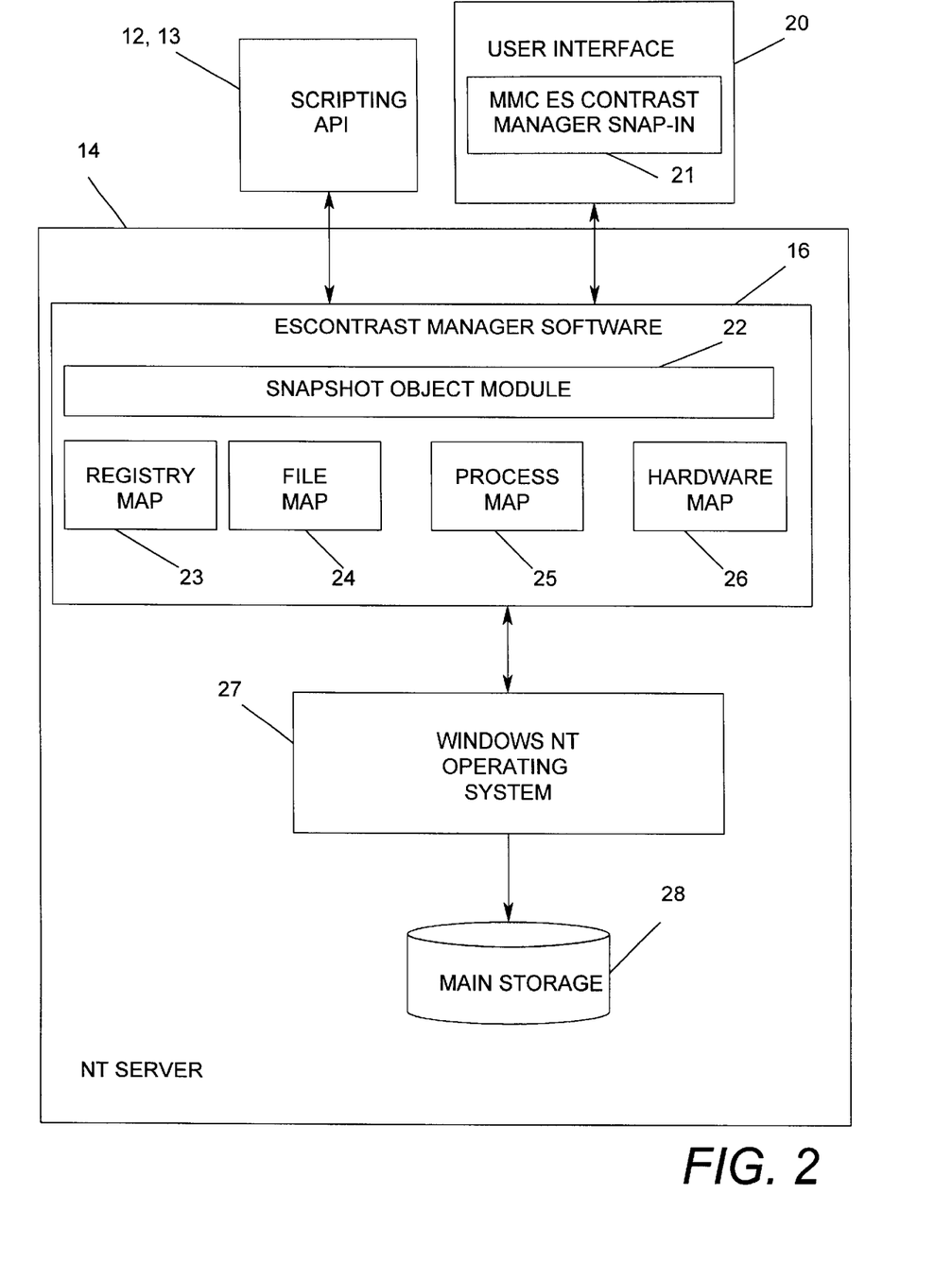
FIG. 2 is a block/modular diagram of the components of the system and method of the present invention.

Referring now to FIG. 2, a modular diagram representing the system and method of the present invention is shown. The Windows NT server 14 includes the ES Contrast Manager software 16, Windows NT Operating System 26, and a shared main storage 27. The scripting API 12 or 13, or an MMC Contrast Manager snap-in 21, which is available from Microsoft Corporation of Redmond, Washington, may be used to access the Contrast Manager Software 16. The Contrast Manager software 16 includes a snapshot object module 22, a Registry Map module 23, a File Map module 24, a Process Map module 25, and a Hardware Map module 26. The Contrast Manager software 16 runs on the Windows NT operating system 27.

The modules within the Contrast Manager software 16 together provide the functionality needed to compare the state of the system at different points in time. Specifically, the snapshot object module 22 provides a common user interface for accessing the functionality of the Contrast Manager. A user can access this functionality by calling the various methods and properties of the snapshot object corresponding to the snapshot object module 22.

A first functionality that the user can access through the snapshot object module 22 is the Registry Map module 23. This module provides the functionality to take a snapshot of a specified section of the system registry and logically hold all registry snapshot objects thus generated. This allows the Contrast Manager software 16 to compare the registry snapshot objects held by the Registry Map module 23 to registry snapshot objects in another snapshot taken at a different point in time. Similarly, the File Map module 24 provides a method for taking a snapshot of specified paths of a file system. It then holds a collection of file snapshot objects that can be compared to file snapshot objects taken in another snapshot at a different point in time. The Process Map module 25 is capable of taking and holding snapshots of various processes being executed by the NT server 14. Finally, the Hardware Map module 26 provides functionality to hold a collection of hardware snapshot objects that can be compared to hardware snapshot objects in another snapshot taken at a different point in time.

A Main storage 28 provides a means for permanently storing the snapshot objects taken by the Contrast Manager software 16 so that they can be used to compare with snapshots of the System State taken at a different point in time.

Figure 3:
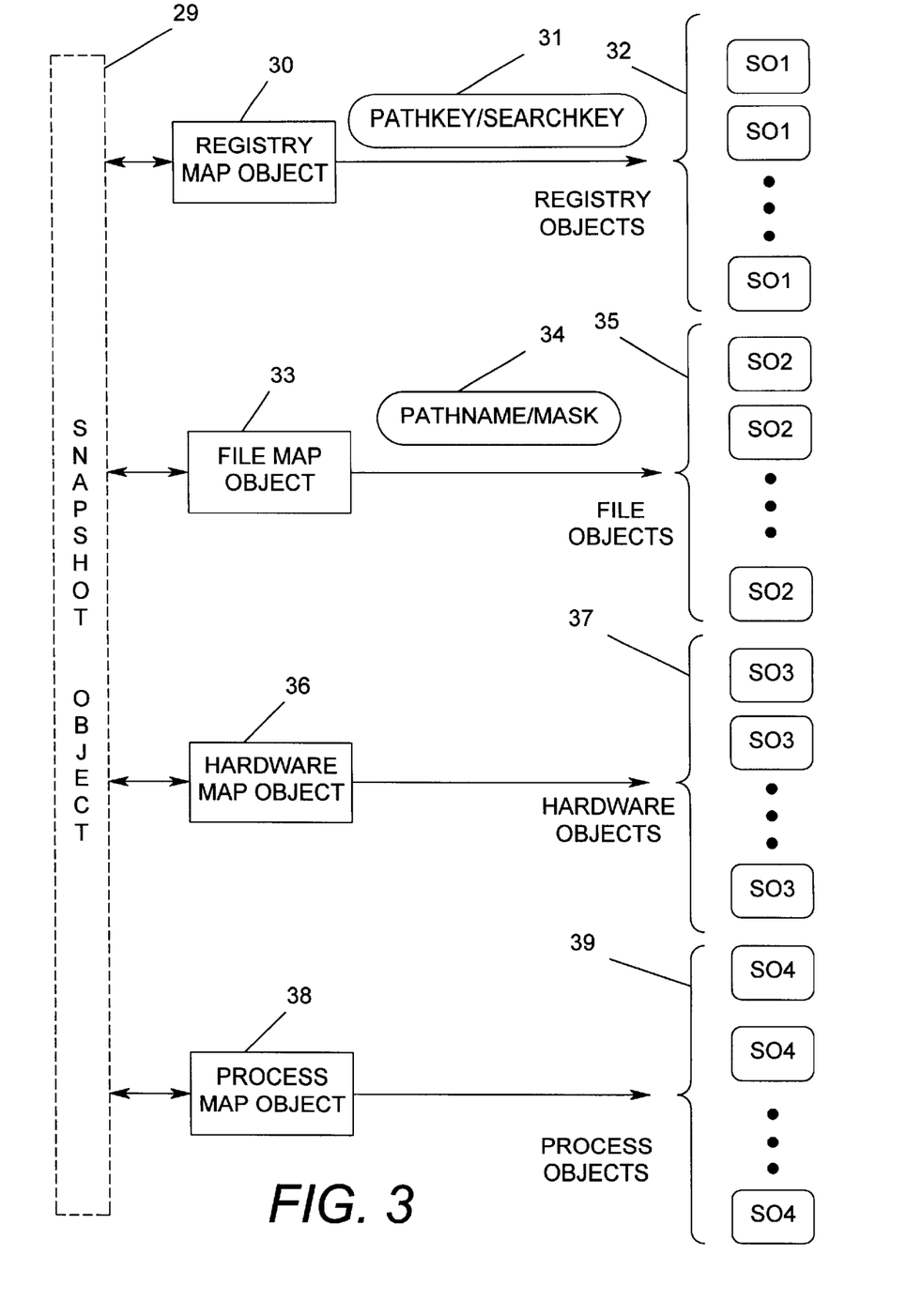
FIG. 3 is a modular block diagram to show the concept of a map object.

Referring now to FIG. 3, the functionality provided by the map modules 23 through 26 together with the snapshot object module 22 is amplified. The Contrast Manager Software 16 instantiates a snapshot object 29 together with a collection of map objects 30, 33, 36 and 38. The snapshot object is a common user interface to access any of the map objects.

A Registry Map object 30 accepts a pathkey/searchkey combination 31 that uniquely identifies a portion of the registry that a user may want to snapshot. The Registry Map object 30 then takes a snapshot of the portion of the registry identified by the pathkey/searchkey 31 and generates a multiplicity of registry snapshot objects SO1 embraced by a bracket 32. This process of creating a registry snapshot will be amplified further hereinbelow.

Similarly, a File Map object 33 accepts pathname/mask combinations 34, for example "c:\windows\*.*". The File Map object 33 takes a snapshot of the portion of the file system identified by the pathname/mask combination 34 and holds a multiplicity of file snapshot objects SO2 embraced by a bracket 35.

Likewise, a Hardware Map object 36 holds a multiplicity of hardware snapshot objects SO3 embraced by a bracket 37. A Process Map object 38, corresponding to the Process Map module 25, takes a snapshot of the processes being executed by the computer system and holds a multiplicity of process snapshot objects SO4 that can be used in a comparison with a different set of process snapshot objects (e.g., SO) that were taken at a different point in time. Thus the concept of a map, as used in this invention, is a method of maintaining a collection of objects of a like type.

Figure 4:
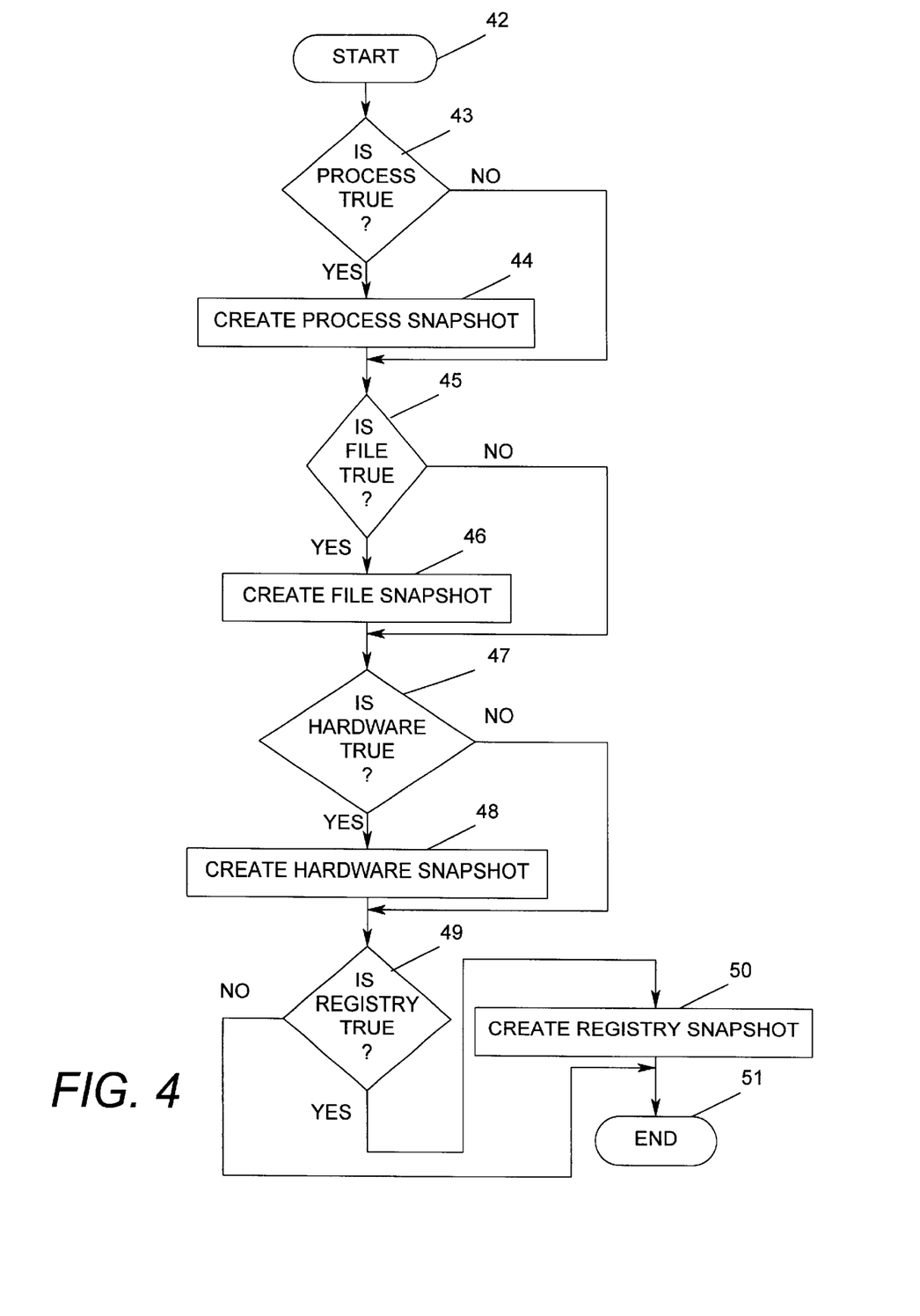
FIG. 4 is a flow chart of the create snapshot process of the present invention.

Referring now to FIG. 4 a flowchart of the overall method of taking a snapshot of the various System States is shown. The process begins with a start bubble 42 followed by a step of making an inquiry 43 as to whether or not a process Boolean variable has been set as true by a user of this method. If the answer to this inquiry is yes, then a process Create Process Snapshot is called (block 44). On the other hand, if the answer to the inquiry 43 is no, or upon the completion of the step depicted by the block 44, another inquiry 45 is made as to whether or not a file Boolean variable has been set as true by the user of this method. If the answer to the inquiry 45 is yes, then a process Create File Snapshot is called (block 46). On the other hand, if the answer to the inquiry 45 is no, or upon the completion of the step depicted by block 46, another inquiry is made as to whether or not a hardware Boolean variable has been set true by a user of this method. If the answer to this inquiry 47 is yes, then a process Create Hardware Snapshot is called (block 48). On the other hand, if the answer to the inquiry 47 is no, or upon the completion of the process depicted by the block 48, another inquiry 49 is made as to whether or not a registry Boolean variable is set as true by a user of this method. If the answer to the inquiry 49 is yes, then a process Create Registry Snapshot is called (block 50). On the other hand, if the answer to the above inquiry 49 is no, or upon completion of the process depicted by the block 50, the method ends (bubble 51).

Figure 5:
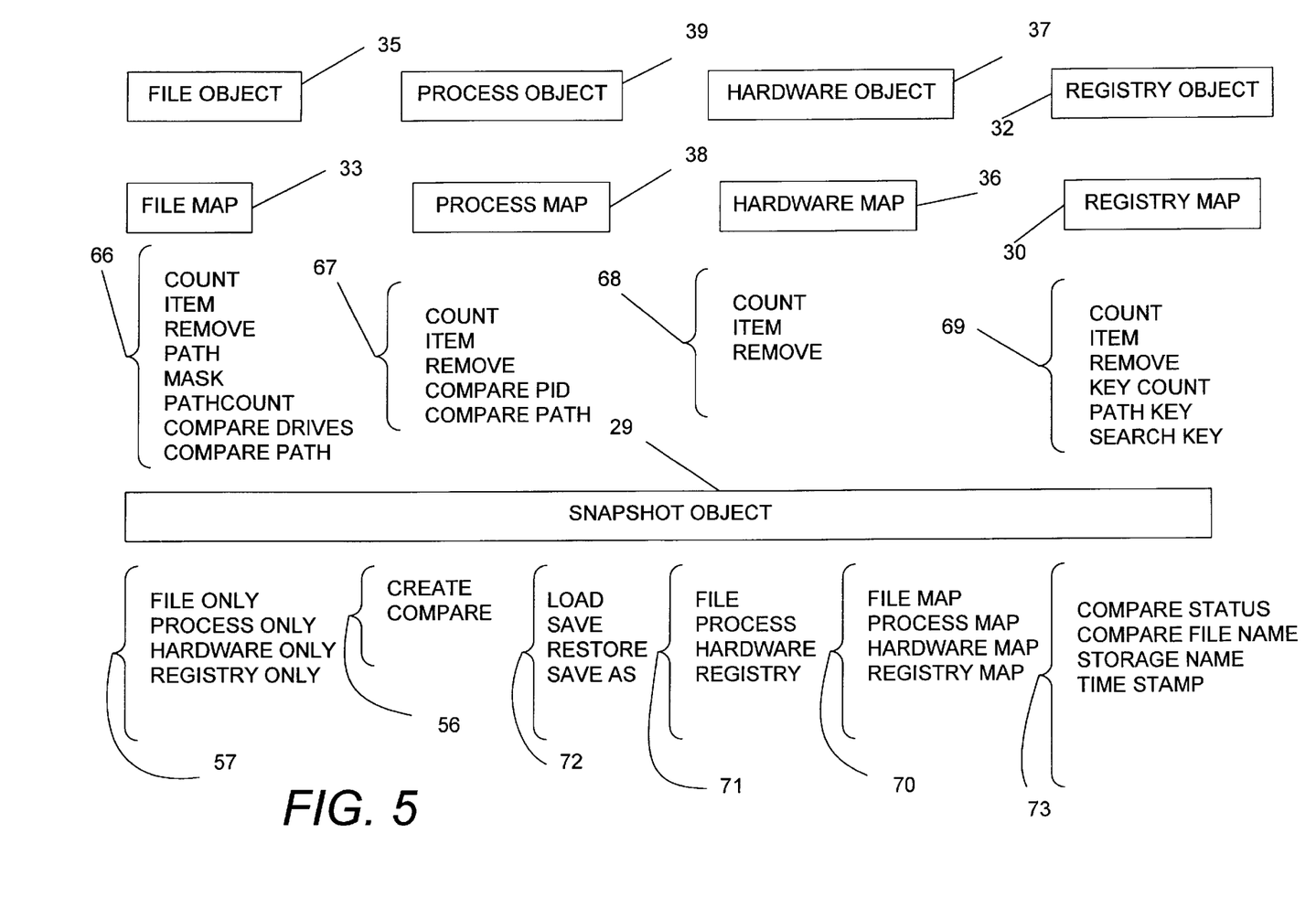
FIG. 5 is an object block diagram that illustrates the various objects in the esContrast Manager software and their associated methods and operations.

Referring now to FIG. 5, a modular block diagram of the various objects in the Contrast Manager software 16 and their associated methods and operations is shown. The snapshot object 29 provides a common user interface with a set of operations and methods with which the functionality of the present invention can be accessed.

A Create method (within bracket 56), which is available from the snapshot object 29, can be used to create a snapshot of the System State. The method of the present invention allows a user to specify whether or not a particular aspect of the System State needs to be recorded by a snapshot. This can be done by setting to TRUE the properties File, Process, Hardware, or Registry (within the bracket 71) of the snapshot object 29. The Create method of the snapshot object in turn calls a Create method in each one of the Map Objects 30, 33, 36 and 38. These map objects then hold a collection of the file, process, hardware, or registry objects 32, 35, 37 and 39, respectively (See FIG. 3). These map objects, e.g. the File Map object 33, the Process Map object 38, the Hardware Map object 36 and the Registry Map object 30 have their own special properties, which can be accessed via the snapshot object 29.

The properties of the map objects provide the functionality needed to create and compare the individual types of System State objects that they hold. For example, Path and Mask properties (within properties 66) of the File Map object 33, are a means for specifying the path and mask combination of the location of the file system that needs to be recorded by the snapshot. Similarly, Path_Key (within properties 69) is a property of the Registry Map object 30 and specifies a particular part of the registry. A Path_Count property (within the properties 66) provides a means for counting the number of path entries specified. Similarly, a Key_Count property (within the properties 69) of the Registry Map object 30, provides a means to count the number of Path_Keys specified.

Some properties of the map objects are common to all map objects. These are Count, Item and Remove properties which are standard properties and methods of all collections. The Count property returns the number of objects in the collection of objects held by any map object. The Item property allows access to a single object in the collection of objects held by a map object by specifying the name or index of the desired object. The Remove property removes a user specified object from the collection of objects held by the map objects. These common properties of the map object as well as the individual system objects can be accessed through the common interface of the snapshot object 29 by using the methods and properties embraced by brackets 70 and 71.

A Compare method 56 of the snapshot object 29 can be used to compare snapshots of System States taken at different times. A Compare method is preceded by a Load method (within bracket 72), which is used to load a previously taken snapshot from the disk and load it into memory. Subsequently, Compare calls the compare methods in each of the individual map objects to compare the collection of the currently held System State objects in the map objects with the System State objects of the snapshot loaded into the memory. The result of this compare operation is that any changes, additions or deletions of objects and their values between the two snapshots is marked out in the snapshot currently held by the map objects. Thus, after the Compare operation, the collection of System State objects held by the map objects reflect the changes, if any, between the two snapshots. These changes can be restored, so that the current snapshot is returned to its original state by using a Restore method (within the bracket 72). Also, a Save_As method 72 can be used to save any snapshot into the disk.

There are properties in the individual map objects that can be used to define what attributes of the System State objects should be considered or ignored while performing the compare method. For example, the property Compare Drives (within the properties 66) and the property Compare Path (within the properties 66) in the file map object 33 can be set to false, which would indicate to the Compare method that any differences in drive names, or path names between the two snapshots should be ignored. It would indicate to the compare method that only the values defined by the particular drive and path combination should be compared. Similarly, Compare PID and Compare Path properties (within the properties 67) of the Process Map object 38 can be used to ignore comparisons on the basis of PID's and paths when comparing processes running on the system. Also, a Search Key property (within the properties 69) of the registry map object 30 can be used to specify a particular value that needs to be searched in a part of the registry specified by the Path Key.

The set of methods within a bracket 73 provide query information about the snapshots. For example, Compare Status returns information as to whether or not a snapshot has been compared against another snapshot. Compare File Name returns the name of the snapshot against which the current snapshot was compared. Storage Name provides the name of the file or the storage pointer of the current snapshot. Timestamp returns the time when the current snapshot was created.

Figure 6:
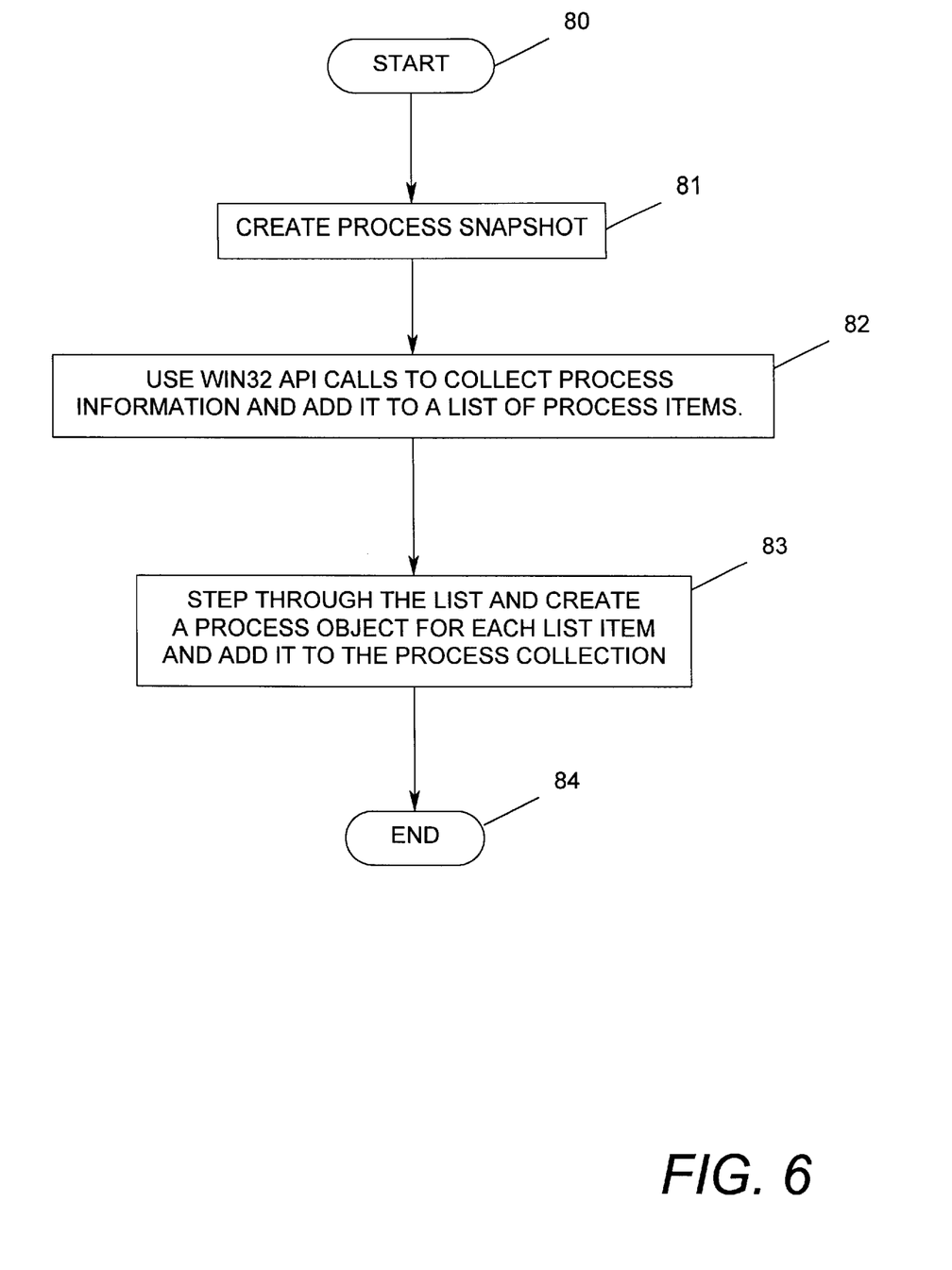
FIG. 6 is a flow chart of the create_process_snapshot process of the present invention.

Referring now to FIG. 6, a flow chart of the create process snapshot method is shown. The method begins with a start bubble 80 followed by a step of creating process snapshot (block 81). Next, the Win32 API is used to collect process information and this information is added to a list of process items (block 82). After this, the method steps through the list created in the previous step and a process object is created for each list item. The process objects thus created are added to a process collection (block 83) and the method ends (bubble 84).

Figure 7:
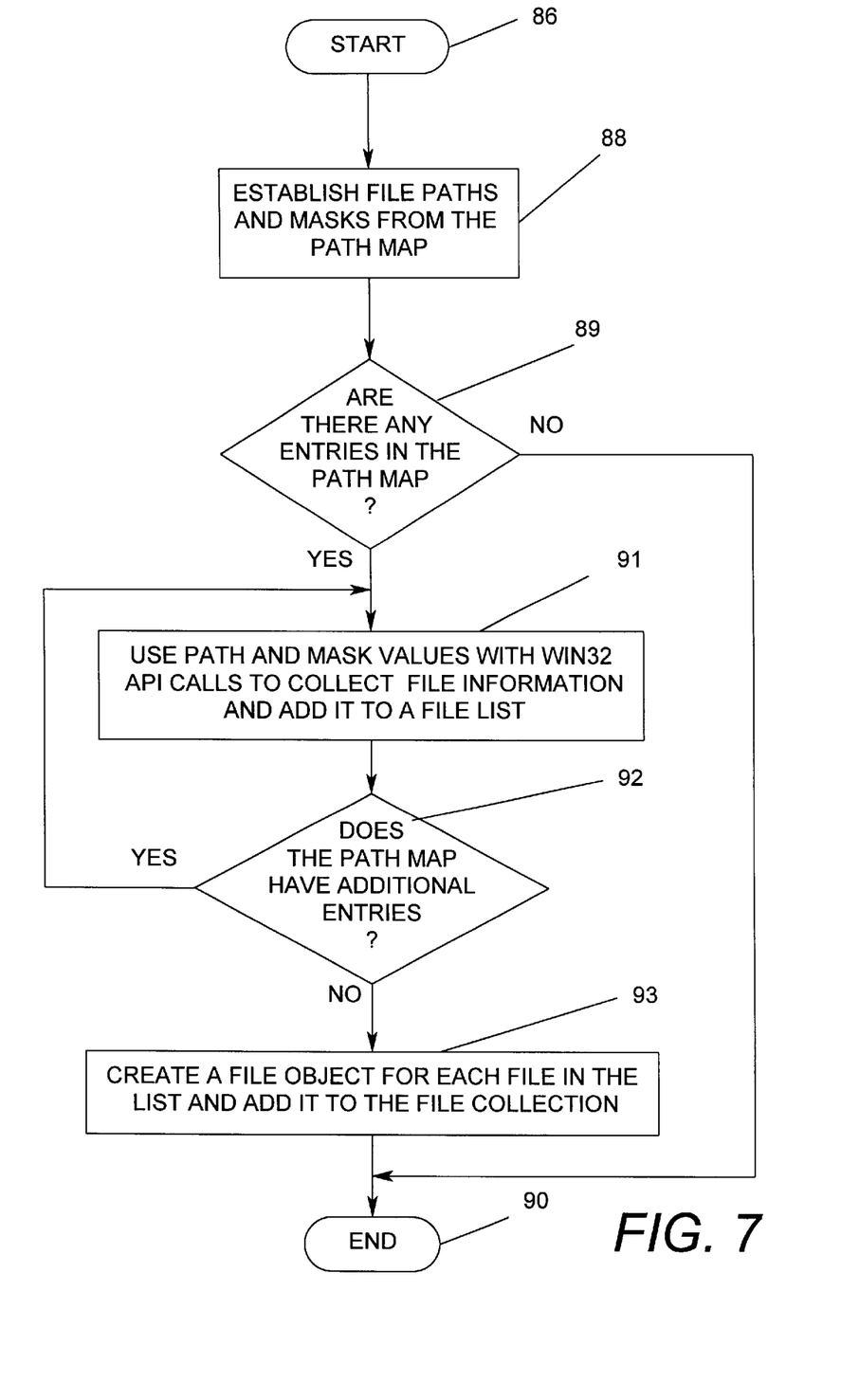
FIG. 7 is a flow chart of the create_file_snapshot process of the present invention.

Referring now to FIG. 7, a flow chart of the create file snapshot method is shown. The method begins with a start bubble 86 followed by a step of establishing file paths and masks from the path map (block 88). After this an inquiry is made as to whether or not there are any entries in the path map (diamond 89). If the answer to this inquiry is no, then the process ends (bubble 90) since there are no entries in the path map.

On the other hand, if the answer to the inquiry in the diamond 89 is yes, then the path and mask values are used with Win32 API calls to collect file information, which information is added to a file list (block 91). An inquiry is next made as to whether or not the path map has additional entries (diamond 92). If the answer to this inquiry is yes, then a return is made back to the block 91 for processing. On the other hand, if there are no more entries, then a file object is created for each file in the list, which is added to the file collection (block 93). After this, the process ends (bubble 90).

Figure 8:
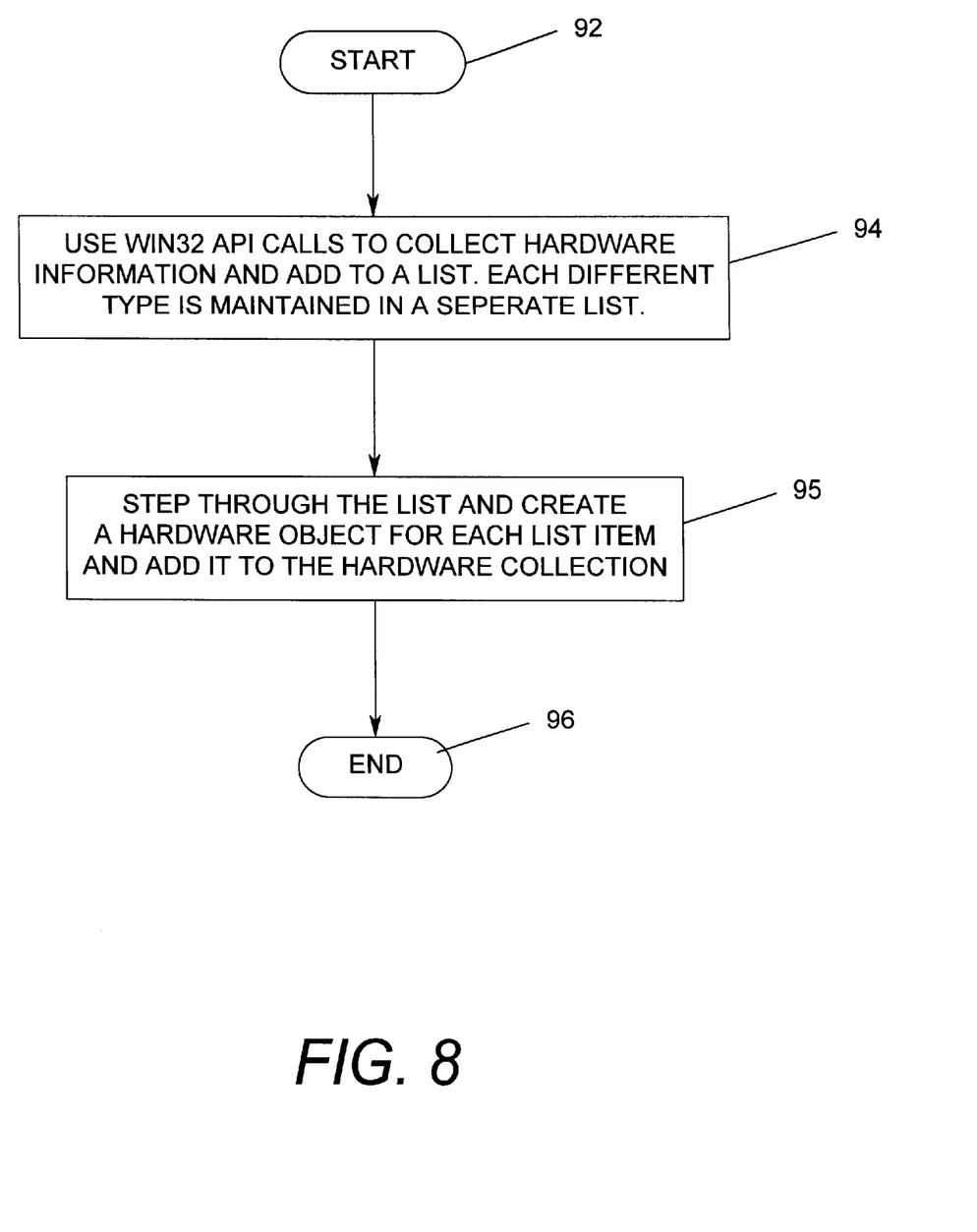
FIG. 8 is a flow chart of the create_hardware_snapshot process of the present invention.

Referring now to FIG. 8, a flow chart of the create hardware snapshot method is shown. The method begins with a start bubble 92. Next, with the use of Win32 calls, hardware information is collected and added to a list. Each different type is maintained in a separate list (block 94). The method then steps through each list and creates a hardware object for each list item and then adds it to the hardware collection (block 95). After this the process ends (bubble 96).

Figure 9A:
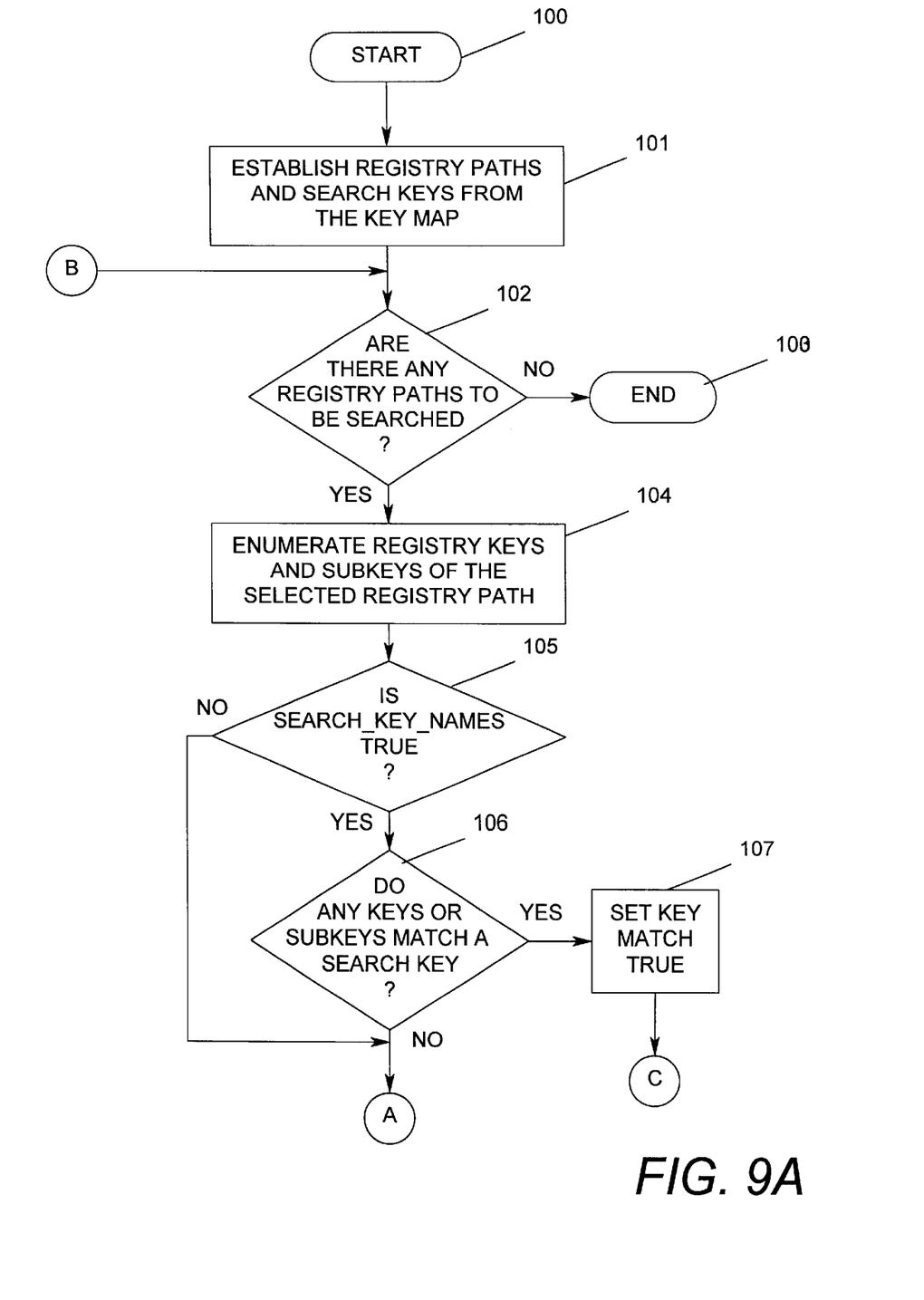
FIGS. 9A and 9B illustrate a flow chart of the create_registry_snapshot process of the present invention.
Figure 9B:
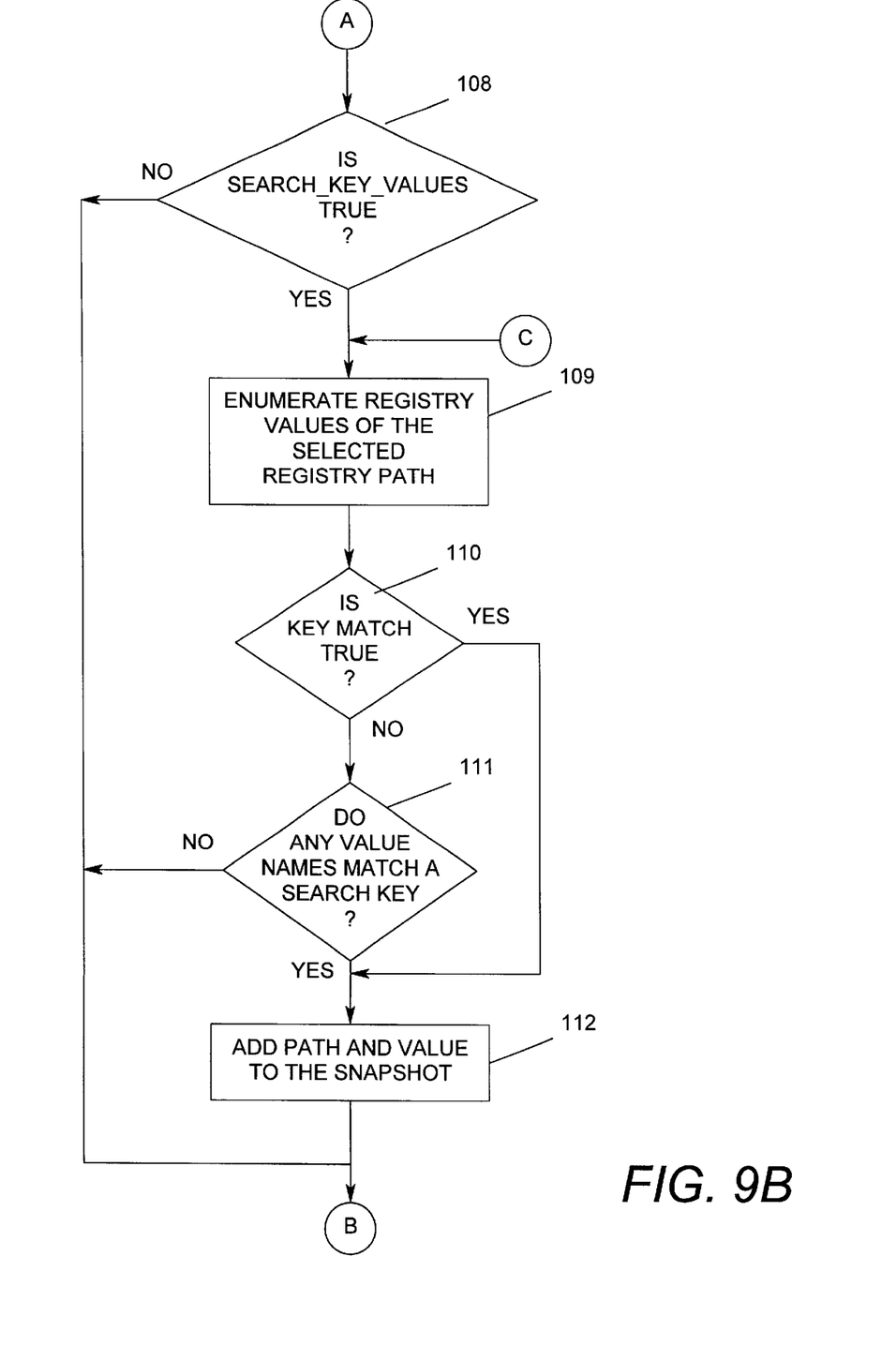

Referring now to FIGS. 9A and 9B, a flow chart of the method for creating a registry snapshot is shown. The method begins with a start bubble 100 followed by a step of establishing registry paths and searching keys from the key map (block 101). Next, an inquiry is made as to whether or not there are any registry paths to be searched (diamond 102). If the answer to this inquiry is no, then the method ends (bubble 103).

On the other hand, if the answer to the inquiry in the diamond 102 is yes, then using WIN32 API calls the established registry paths are traversed (block 104). After this, another inquiry is made as to whether or not search_key_names is true (diamond 105). If the answer to this inquiry is yes, then yet another inquiry is made as to whether or not any keys or sub-keys match a search key (diamond 106). If the answer to this inquiry is no, then the process illustration continues in FIG. 9B as depicted by a connector A. If the answer to the inquiry in the diamond 105 is no, then the method also proceeds to the connector A. If the answer to the inquiry in the diamond 106 is yes, then key match is set to true (block 107) and the process illustration continues in FIG. 9B as depicted by a connector C.

Referring now to FIG. 9B at the connector A, still another inquiry is made as to whether or not search_key_values is true (diamond 108). If the answer to this inquiry is no, then a return is made back to the diamond 102 (FIG. 9A) as denoted by a connector B. On the other hand, if search_key_values is true, then using WIN 32 API calls the registry values of the established registry paths are collected (block 109). It is pointed out that the connector C intersects the method just prior to the block 109.

Another inquiry is then made as to whether or not key match is true (diamond 110). If the answer to this inquiry is no, then still another inquiry is made as to whether or not any value names match a search key (diamond 111). If the answer to this inquiry is no, then a branch is made back to the diamond 102 (FIG. 9A) as denoted by the connector B. On the other hand, if the answer to this inquiry is yes, then path and value are added to the snapshot (block 112) and a branch is made back to the diamond 102 (FIG. 9B) as denoted by the connector B. It is pointed out that if the answer to the inquiry in the diamond 110 is yes, then the diamond 111 is skipped.

Figure 10A:
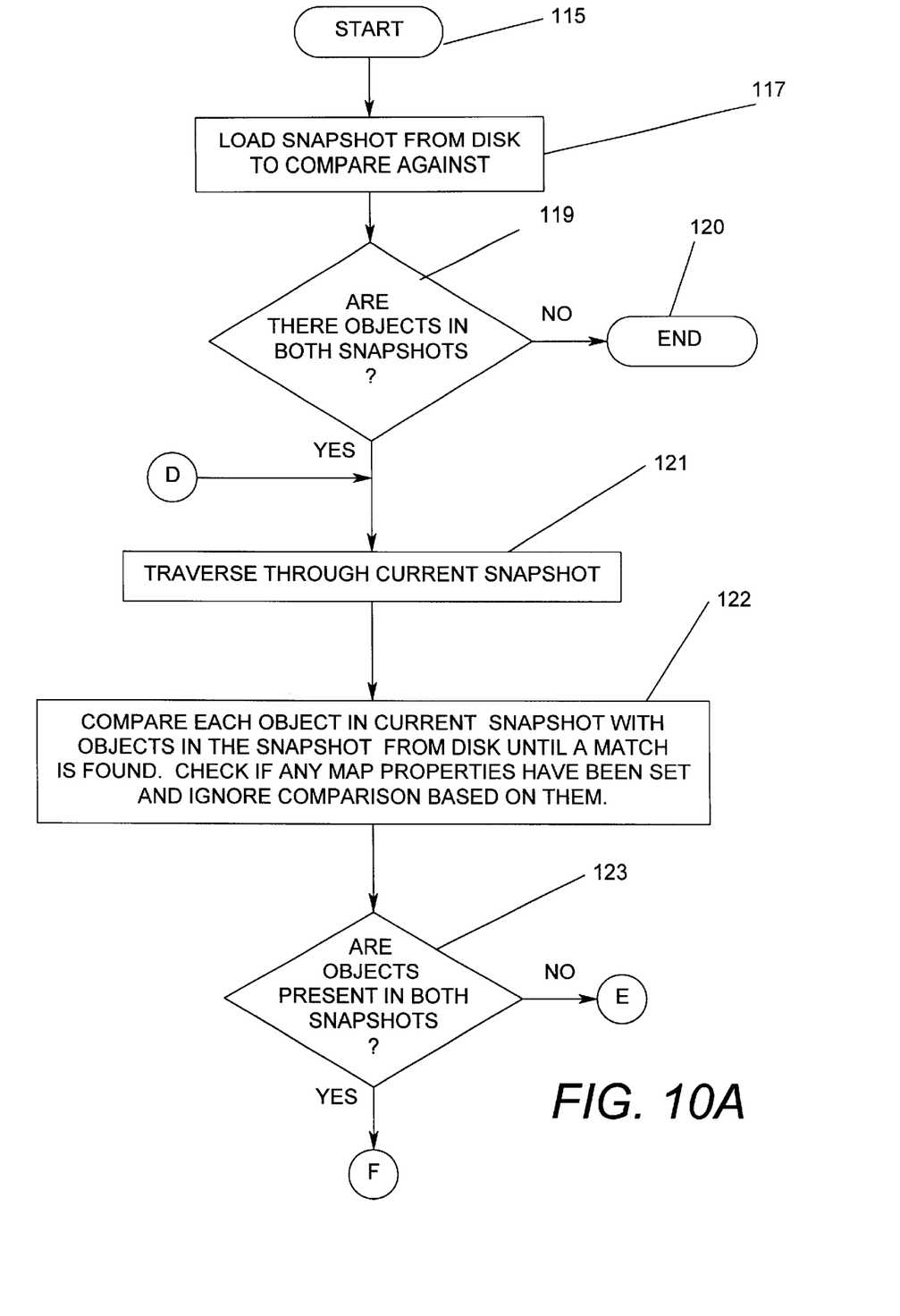
FIGS. 10A, 10B and 10C illustrate a flow chart of the compare process of the present invention.

Referring now to FIG. 10A, the first of a three-sheet illustration of the compare process is shown. The process begins with a start bubble 115 followed by a step of loading the snapshot from the disk 28 for comparing with the current snapshot in memory (block 117). After this, an inquiry is made as to whether or not there are objects in both snapshots (diamond 119). If the answer to this inquiry is no, then the process ends (bubble 120) since there is nothing to compare.

On the other hand, if there are objects in both snapshots, then each object in the snapshot from the disk is compared with objects in the current snapshot. Also, a check is made as to whether or not any map properties have been set that would affect the comparison of the file and process data items as described for blocks 66 and 67 of FIG. 5 (block 122). After this, another inquiry is made as to whether or not objects are present in both snapshots (diamond 123). If the answer to this inquiry is yes, then the process illustration continues in FIG. 10B at a connector A. On the other hand, if the answer to this inquiry is no, then the process illustration continues in FIG. 10C at a connector B.

Figure 10B:
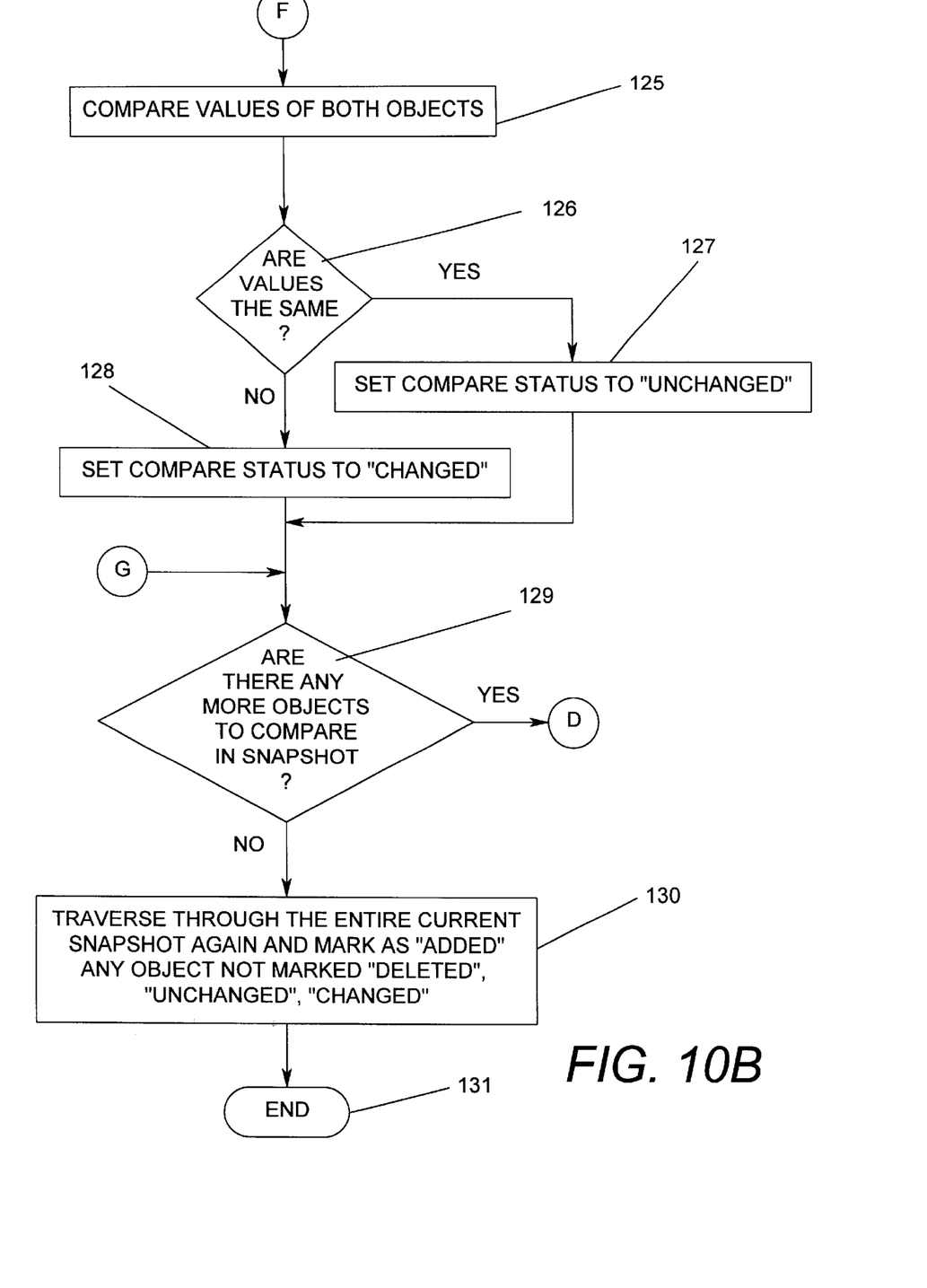
Figure 10C:
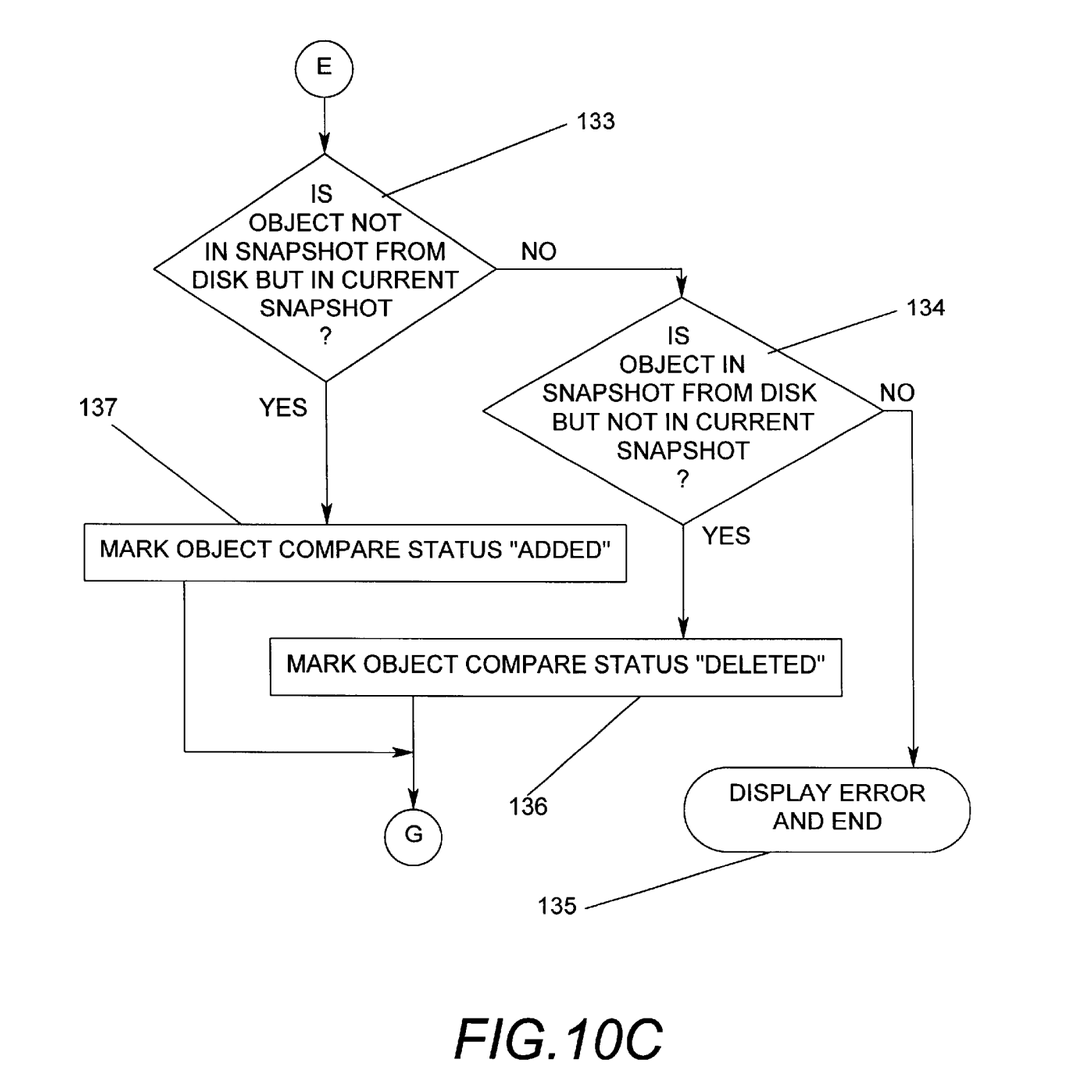

Referring now to FIG. 10B at the connector A, the values of both objects are compared (block 125). Next, an inquiry is made as to whether or not values of the objects are the same (diamond 126). If the answer to this inquiry is yes, then compare status of the object in the current snapshot is set to "Unchanged" (block 127). On the other hand, if the answer is no, then compare status of the object in the current snapshot is set to "Changed" (block 128).

Following the above, another inquiry is made as to whether or not there are any more objects to compare in the snapshot from the disk (diamond 129). If the answer to this inquiry is yes, then a branch is made back to the block 121 (FIG. 10A) as denoted by a connector C. On the other hand, if the answer to this inquiry is no, then a traversal is made through the entire current snapshot again and mark as "Added" any object not marked "Deleted", "Unchanged" or "Changed" (block 130). After this the process ends (bubble 131).

Referring now to FIG. 10B at the connector B, an inquiry is made as to whether or not an object not in the snapshot from the disk but is in the current snapshot (diamond 133). If the answer to this inquiry is no, then another inquiry is made as to whether or not an object is in the snapshot from the disk but not in the current snapshot (diamond 134). If the answer to this inquiry is no, then an error is displayed and the process ends (bubble 135). On the other hand, if the answer to the inquiry in the diamond 134 is yes, then the object compare status of the object in the current snapshot is marked "Deleted" (block 136). After this, the process branches back to the diamond 129 (FIG. 10B) as denoted by a connector D. If the answer to the inquiry in the diamond 133 is yes, then the object compare status of the object in the current snapshot is marked as "Added" (block 137) and the process branches back to the diamond 129 (FIG. 10B) as denoted by a connector D.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine,. such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A method for comparing System States of a computer system at different instants of time, the computer system having a memory and an operating system persistently stored in a storage device, and system components, the method comprising the operations of:

a. creating a snapshot object for interfacing with functionalities of the computer system, and a plurality of map objects for holding specified types of System State objects corresponding to specified system components;

b. using the snapshot object, creating a first collection of System State objects which record the status of the computer system at a first instant of time;

c. storing the first collection of System State objects in the memory;

d. loading into the memory a second collection of System State objects previously created at a second instant of time and stored in the storage device; and, e. comparing the first collection with the second collection and providing an indicia of any differences therebetween.

2. The method as in claim 1 wherein operation b further includes the operations of:

f. receiving a pathkey identifying a portion of a registry for recording the status thereof; and, g. receiving a pathname identifying a portion of a file system for recording the status thereof.

3. The method as in claim 1 wherein, for each specified type of System State objects, operation b includes the operations of:

h. using a programming interface to collect information about the status of the specified system component corresponding to the specified type of System State objects;

i. adding the collected information to a list of items; and j. stepping through the list of items and generating a System State object for each of the items in the list.

4. A method for comparing System States of a computer system at different instants of time, the computer system having a memory and an operating system persistently stored in a storage device, and system components, the method comprising the operations of:

a. creating a snapshot object for interfacing with functionalities of the computer system;

b. using the snapshot object, creating a first collection of System State objects which record the status of the computer system at a first instant of time;

c. storing the first collection of System State objects in the memory;

d. loading into the memory a second collection of System State objects previously created at a second instant of time and stored in the storage device; and, e. comparing the first collection with the second collection and providing an indicia of any differences therebetween, including:

f. traversing through the second collection of System State objects;

g. comparing each System State object in the first collection with each System State object in the second collection until a match is found;

h. determining if the matched System State objects have the same values, and if not;

i. setting a compare status to indicate that said System State object has changed between the second and first instants of time.

5. The method as in claim 4 wherein the matched System State objects have the same values, further including the operation of setting a compare status to indicate that the System State object has not changed between the second and first instants of time.

6. The method as in claim 4 further including the operation of determining if a System State object in the first collection is not present in the second collection, and if so, setting a compare status to indicate that the System State object has been added between the second and the first instants of time.

7. The method as in claim 6 further including the operation of determining if a System State object in the second collection is not present in the second collection, and if so, setting a compare status to indicate that the System State object has been deleted between the second and the first instants of time.

8. The method as in claim 4 wherein the operating system is Windows NT.

9. A storage medium encoded with machine-readable computer program code for comparing System States at different instants of time of a computer system having a memory and an operating system stored in a storage device, wherein, when the computer program code is executed by a computer, the computer performs the operations of:

a. creating a snapshot object for interfacing with functionalities of the computer system, and a plurality of map objects for holding specified types of System State objects corresponding to specified system components;

b. using the snapshot object, creating a first collection of System State objects which record the status of the computer system at a first instant of time;

c. storing the first collection of System State objects in the memory;

d. loading into the memory a second collection of System State objects previously created at a second instant of time and stored in the storage device; and, e. comparing the first collection with the second collection and providing an indicia of any differences therebetween.

10. The storage medium as in claim 9 wherein operation b further includes the operations of:

f. receiving a pathkey identifying a portion of a registry for recording the status thereof; and g. receiving a pathname identifying a portion of a file system for recording the status thereof.

11. The storage medium as in claim 9 wherein, for each specified type of System State objects, operation b includes the operations of:

h. using a programming interface to collect information about the status of the specified system component corresponding to the specified type of System State objects;

i. adding the collected information to a list of items; and j. stepping through the list of items and generating a System State object for each of the items in the list.

12. The storage medium as in claim 9 wherein the operation of comparing includes the operations of:

h. traversing through the second collection of System State objects;

i. comparing each System State object in the first collection with each System State object In the second collection until a match is found;

j. determining if the matched System State objects have the same values, and if not;

K. setting a compare status to indicate that said System State object has changed between the second and first instants of time.

13. The storage medium as in claim 12 wherein the matched System State objects have the same values, further including the operation of setting a compare status to indicate that said System State object has not changed between the second and first instants of time.

14. The storage medium as in claim 12 further including the operation of determining if a System State object in the first collection is not present in the second collection, and if so, setting a compare status to indicate that the System State object has been added between the second and first instants of time.

15. The storage medium as in claim 14 further including the operation of determining if a System State object in the second collection is not present in the second collection, and if so, setting a compare status to indicate that the System State object has been deleted between the second and first instants of time.

16. The storage medium as in claim 9 wherein the operating system is Windows NT.

* * * * *